(12) United States Patent
Schmitz

(10) Patent No.: US 8,087,243 B2
(45) Date of Patent: Jan. 3, 2012

(54) INTERNAL COMBUSTION ENGINE TURBOCHARGED BY A TURBOCHARGER

(76) Inventor: Gerhard Schmitz, Saint-Vith (BE)

(*) Notice: Subject to any disclaimer, the term of this patent is extended or adjusted under 35 U.S.C. 154(b) by 388 days.

(21) Appl. No.: 12/469,849

(22) Filed: May 21, 2009

(65) Prior Publication Data
US 2009/0293475 A1    Dec. 3, 2009

(30) Foreign Application Priority Data
May 23, 2008 (BE) .................................. 2008/0290

(51) Int. Cl.
*F02B 33/44* (2006.01)
(52) U.S. Cl. .......................................... 60/598; 60/612
(58) Field of Classification Search ............ 60/597–612; 123/561–562
See application file for complete search history.

(56) References Cited

U.S. PATENT DOCUMENTS

| | | | | |
|---|---|---|---|---|
| 4,373,337 A | * | 2/1983 | Widmann | 60/611 |
| 4,392,459 A | * | 7/1983 | Chareire | 123/21 |
| 6,553,977 B2 | * | 4/2003 | Schmitz | 123/561 |
| 7,322,194 B2 | * | 1/2008 | Sun et al. | 60/605.2 |
| 2002/0050253 A1 | * | 5/2002 | Schmitz | 123/64 |
| 2004/0255579 A1 | * | 12/2004 | Leduc et al. | 60/600 |
| 2005/0000215 A1 | * | 1/2005 | Baeuerle | 60/608 |
| 2005/0166592 A1 | * | 8/2005 | Larson et al. | 60/611 |
| 2007/0175215 A1 | * | 8/2007 | Rowells | 60/605.2 |

FOREIGN PATENT DOCUMENTS

| | | |
|---|---|---|
| DE | 100 61 846 A1 | 6/2002 |
| EP | 1426557 A1 | 6/2004 |
| JP | 59-203823 | 11/1984 |
| WO | 2008/018577 A1 | 8/2007 |

OTHER PUBLICATIONS

Search Report for EP 0944720 dated Aug. 4, 2009 (3 pages).

* cited by examiner

*Primary Examiner* — Thanh Lam
(74) *Attorney, Agent, or Firm* — Cozen O'Connor

(57) ABSTRACT

The invention is intended to optimize the recovery of the residual energy contained in the exhaust gases of an internal combustion piston engine by means of a turbocharger group, in which each cylinder (1) from which the combustion gases escape through the exhaust pipe (5) is equipped with a turbine (7), and the volume (5) between the exhaust valve (3) and the inlet of the turbine (7), detrimental to the efficiency thereof, is minimized by the attachment of the turbine directly on the cylinder head of the engine without the intermediary of a collector and, the counter-pressure acting on the piston of the cylinder (1) during its exhaust upstroke is minimized owing to an adjustment of the turbine pressure by means of an additional exhaust valve (4), called a "dynamic discharge valve", optionally equipped with a downstream throttle valve (8) in order to continuously adjust the corresponding flow rate and, consequently, the pressure of the turbine unless the control of the dynamic discharge valve (4) is not variable itself.

6 Claims, 8 Drawing Sheets

INTERNAL COMBUSTION ENGINE TURBOCHARGED BY A TURBOCHARGER

This invention relates in general to an internal combustion piston engine.

More specifically, the invention relates to an internal combustion piston engine of the type comprising at least one cylinder equipped with an exhaust valve associated with the turbine of a turbocharger intended to recover some of the residual energy contained in the combustion gases, by means of an additional expansion thereof in said turbine of the turbocharger so as to drive the compressor of this same turbocharger and thus turbocharge said internal combustion engine, in which the turbine of each cylinder that releases said combustion gases is mounted directly on the cylinder head downstream of the exhaust valve and without the intermediary of a manifold located between the cylinder head and the inlet of said turbine.

The most recent improvements made to internal combustion engines relate in particular to a turbocharge obtained by means of a turbocharger group, hereinafter referred to as "turbo", driven by the residual energy available from the exhaust gases.

The change in the thermodynamic state of these exhaust gases, after expansion thereof, leaving a cylinder of an engine, for example the cylinder 1 equipped with its piston 2 in the appended FIG. 1, in order to be routed to the turbine 7 of a turbo, can be shown by the diagram (T, S) in the appended FIG. 2, giving the temperature of the gas T as a function of its entropy S. In this FIG. 2, the dotted lines indexed by $V_i$ represent the isochores, i.e. the lines that connect the gas states at the same density, while the thin, continuous lines, indexed by $P_i$ are the isobars, i.e. the lines that connect the gas states at the same pressure. According to the thermodynamics, the mechanical work produced while the gas changes from a state 1 to another state 2 is proportional to the difference in temperature of the gas before and after this change. The change in the exhaust gas of an internal combustion engine with turbo is described by the series of states 1, 2 and 3 (see FIG. 2) where state 1 is that of the combustion gas after its expansion in the cylinder 1 of the engine and just before the exhaust valve 3 is opened, state 2 is the state of the gas in the volume formed by the exhaust pipe 5 and the exhaust manifold 12, which brings the combustion gas to the inlet of the turbine 7, and state 3 is that of the combustion gas at the outlet of the turbine, in which the pressure $P_3$ is normally close to the ambient pressure. The change in the gas between state 1 and state 2 can be represented approximately by an isothermal expansion, i.e. an increase in the volume of $V_i$ to $V_2$, accompanied by a drop in pressure from $P_i$ to $P_2$, and a significant increase in entropy at constant temperature. Consequently, no beneficial work is produced. The extraction of the beneficial mechanical work by means of the turbine 7 will be performed by the most isentropic expansion possible of the combustion gases from pressure $P_2$ to pressure $P_3$. The greater this expansion is, the greater the fall in temperature will be, and the greater the amount of recoverable work will be. Knowing that $P_3$ is close to ambient pressure, therefore given, the drop in isentropic pressure that can occur inside the turbine 7 will be lower the closer $P_2$ is to $P_3$. In view of the characteristic of isobars and isochores, it is observed that the higher $V_2$ is with respect to $V_1$, the more point 2 will be moved to the right on the diagram (T, S) and the more this point will be located on a corresponding isobar $P_2$ close to that of $P_3$. Consequently, it can easily be noted that the volumes (5 and 12) between the exhaust valve 3 and the inlet of the turbine 7 must be as small as possible in order to maximize the recoverable work by means of an additional expansion of the combustion gases inside the turbine. Indeed, if one manages to reduce the size of this volume (5 and 12) from $V_2$ to $V_2$, one will immediately notice that $P_2$ is increasingly removed from $P_3$, thereby leading to a drop in temperature due to the expansion $P_2$ to $P_3$ and, consequently, a greater drop in enthalpy of the combustion gases through the turbine 7. Thus, greater mechanical work is produced, which work can be recovered and used by a compressor mounted on the same shaft as the turbo. Thus, it can be said that the "quality of the combustion gas" downstream of the exhaust valve 3 and upstream of the turbine 7 deteriorates as this drop in isothermal pressure between state 1 and 2 (or 2') increases, resulting from an increase in the volume during the change in state from 1 to 2 (or 2').

The appended FIG. 3 moreover shows the dependence of the pressure at the outlet of the compressor of the turbocharger as a function of the volumes (5 and 12) at the inlet of the turbine and the temperature of the exhaust gases, while the other parameters, such as the pressure inside the cylinder when the exhaust valve 3 is opened, remain unchanged. According to the graph shown, the greater these volumes (5 and 12) are at the inlet of the turbine, the lower the pressure is at the outlet of the compressor regardless of the temperature of the exhaust gases and, consequently, the lower the beneficial work collected will be. A maximum recovery of the residual energy of the exhaust gases of an internal combustion engine, so as to increase the work of the turbocharger, therefore remains an unquestionable benefit.

An improvement can be made to an internal combustion piston engine by optimizing, by means of the turbocharger, the recovery of the residual energy contained in the exhaust gases of this engine. To this end, the turbine of each cylinder releasing said combustion gases is mounted directly on the cylinder head of said engine downstream of the exhaust valve and without the intermediary of an exhaust collector located between said cylinder head and the inlet of the turbine.

Thus, a first optimization of the recovery of the residual energy of the exhaust gases of an internal combustion engine by means of a turbo consists of attaching a turbine, by a cylinder, directly on the cylinder head of the engine, and without the intermediary of an exhaust collector, as shown 12 in FIG. 1, located between the cylinder head and the inlet of the turbine. Although it can be envisaged for all internal combustion engines, this configuration will be indicated particularly for the two-stroke engine, or for the low-pressure cylinder of a five- or four-and-a-half stroke engine where the exhaust is performed by a cylinder working according to a two-stroke cycle, i.e. characterized by the exhaust of combustion gases by a crankshaft rotation.

A second optimization of the recovery of the residual energy of the exhaust gases of an internal combustion engine by means of a turbo consists of an improvement in the adjustment of the partial loads.

Generally, the residual energy of the recoverable exhaust gases is greater than that necessary for the compressor of the turbo to perform the compression of the same amount of fresh air. To prevent the turbo from "overreacting", i.e. from having its rotation speed go too high, the conventional turbo engines are equipped with a discharge valve provided between the exhaust valve, i.e. 3 in FIG. 1, and the inlet of the turbine. When this valve is closed, all of the exhaust gases pass through the turbine. This passage is very useful for accelerating it, but it can lead to a risk of "overreaction" of the turbo. When there is a risk of overreaction, the discharge valve opens by a mechanism controlled either by the pressure supplied by the compressor or by an electronic control. It should be noted that this control is more static, i.e. it does not follow the rhythm of the engine cycles generated inside the engine, as for example in the case of intake and exhaust valves that are controlled by cams rotating at the speed of operation of the engine cycles. Once the valve is open, the pressure drops at the inlet of the turbine, this drop being caused by some of the exhaust gases that escape through the discharge valve without passing through the turbine. Nevertheless, there remains, and even must remain, a pressure inside the turbine, which pressure is greater than that at the outlet thereof, the latter pressure being close to the ambient pressure. This pressure at the inlet of the turbine, also called the turbine counter-pressure, is felt inside the cylinder of the engine so that, the higher this pressure is, the more the piston must "work" against it when it rises toward the top dead center (TDC). It is noted that the conventional discharge valve acts on the counter-pressure indifferently and non-dynamically: it must reduce the pressure at the inlet of the turbine in order to reduce the power supplied to the compressor, but it must simultaneously maintain a power sufficient for the turbo to be capable of supplying pre-compressed air so as to provide the load required for the engine.

However, the disadvantage of this quasi-static procedure is that it leads to a counter-pressure that is also quasi-constant: on the one hand, this pressure is lower than the pressure inside the cylinder after expansion, thereby resulting in a lower turbine efficiency than would be possible if this last pressure available inside the cylinder of the engine were used; on the other hand, this pressure will be maintained in the cylinder even during the upstroke of the piston of the cylinder toward its TDC, increasing the work to be performed by this piston during its stroke. It can be confirmed that the adjustment of the turbine power by means of a conventional discharge valve is inevitably accompanied by an "additional deterioration of quality" of the exhaust gas available at the inlet of the turbine during its isothermal expansion as the exhaust valve opens, during which its pressure falls to the counter-pressure level, this latter being controlled by said conventional discharge valve.

Another disadvantage of a conventional discharge valve, inserted between the exhaust valve 3 of the engine, in FIG. 1, and the inlet of the turbine 7 concerns the volume required by this insertion, given that a significant reduction in this volume between the exhaust valve and the inlet of the turbine is desirable, as demonstrated above.

This invention is intended to propose an internal combustion engine that does not have these two disadvantages.

To achieve this objective, the invention includes at least one additional exhaust valve, also called a "dynamic discharge valve", provided in the cylinder head and configured so that the gases that escape through this valve are sent directly to an exhaust system without first passing through the turbine of said turbocharger and so that the opening of said additional valve is controlled so as to open during each exhaust cycle performed in said cylinder, at the earliest substantially after the exhaust valve 3 opens at the inlet of the turbine and so as to close at the latest when the piston of said cylinder has just passed its top dead point after having completed its exhaust stroke.

Thus, according to the invention, at least two exhaust valves are provided in the cylinder: at least one valve serves to make the connection between the cylinder and the inlet of the turbine and at least one other valve serves to make the connection between the cylinder and the exhaust system, without having the gases that pass through it pass through the turbine. This second exhaust valve will hereinafter be called the "dynamic discharge valve", with the term "dynamic" referring to the fact that this discharge valve, unlike the conventional discharge valve, opens at the rhythm of the thermal cycles performed in the engine, as is the case for ordinary intake and exhaust valves. This dynamic discharge valve must open at the earliest approximately 30 to 60 degrees of the crankshaft after the opening of the first exhaust valve, hereinafter called the "turbine exhaust valve".

The dynamic discharge valve supplies the turbine with combustion gases under the highest possible pressure while the piston of the cylinder is located in the vicinity of its top dead point (TDP). At this time, the crank-arm system linking this piston to the crankshaft leads to the minimum speed of this piston that, after a certain time, will therefore produce only a minimal variation in the volume in the cylinder. This causes fewer disturbances with regard to the work exchanged between the piston and the crankshaft owing to the presence of a counter-pressure due to the turbine. Once the turbine has been supplied with the "best possible quality" combustion gas, the dynamic discharge valve, according to the invention, tends to minimize the residual pressure in the cylinder during the upstroke of the piston to its top dead point.

To adjust the load of the turbo, it is now necessary to be capable of controlling the amount of combustion gases that escape through the dynamic discharge valve and that, consequently, will not be available to the turbine. This operation can be performed in one of the following three ways:

Use of a variable and continuous control of the dynamic discharge valve so as to increase the duration and amplitude of the opening while reducing the work necessary by the turbine.

Use of a variable throttling downstream of the dynamic discharge valve that will open while reducing the work necessary by the turbine.

Use of a variable discontinuous control of the dynamic discharge valve so as to select a lift law from at least two different lift laws in order to control said valve so as to roughly adjust the flow rate in question, and additional use of a variable throttling downstream of the dynamic discharge valve, so as to more finely adjust the flow rate through the dynamic discharge valve. The simplest discontinuous variable control will consist of a mechanism that activates or deactivates the lifting of the valve in question.

Thus, according to another feature, the invention includes a throttle valve with variable closure and capable of being controlled, which valve is provided in an exhaust pipe supplied with the combustion gases passing through the dynamic discharge valve and configured so that the amount of combustion gases that escape from said exhaust pipe and that are no longer available for the turbine is directly proportional to the opening of this throttle valve, thus reducing the power of said turbine.

Similarly, according to another feature, the invention includes a control that can variably and continuously adjust the opening of the dynamic discharge valve so that the duration and maximum lift of the opening of this dynamic discharge valve can be adjusted in order to cause a second determined portion of the combustion gases to escape so that the first portion of combustion gases, which is directed toward the turbine through the turbine exhaust valve, is adapted to the power necessary for the turbine.

In addition, this invention also involves a variable, continuous or even discontinuous control of the turbine exhaust valve, so as to reduce the overlapping of openings of this turbine exhaust valve and the dynamic discharge valve, during partial load operation, in order to minimize the possibility that some of the exhaust gases leaving the cylinder through the turbine exhaust valve will return to the cylinder to then escape through the other exhaust valve, i.e. the dynamic discharge valve.

Thus, according to an additional feature, the invention provides a control that enables variable adjustment of the opening of the turbine exhaust valve, so that the overlapping of the opening of this turbine exhaust valve with the opening of the dynamic discharge valve is minimized.

It is noted that the turbo power adjustment, and therefore also the engine power adjustment according to this invention, differs fundamentally from the subject matter of patent EP no. 1 201 892 B1 (Gerhard SCHMITZ) entitled "Five-Stroke Internal Combustion Engine". Indeed, one will note the absence, in the engine according to the invention, of the bypass valve as well as of the associated pipes, which are present in the device of the aforementioned patent. These enable only the selection of two basic operating states and require the addition of a conventional discharge valve between the exhaust valve and the inlet of the turbine.

The invention, the subject matter of this application, enables the minimization of the size of the volume located between the exhaust valve and the inlet of the turbine, and the continuous adjustment of the engine load by means of either a variable control of the dynamic discharge valve or a variable control of the throttle valve or a combination of these two means.

The invention can be better understood, and various objectives, features and advantages thereof will become clearer with the following description, which will refer to the diagrammatic drawings provided solely for the purpose of illustrating embodiments of the invention, in which:

FIG. 1 is a top and cross-section view of a cylinder of an engine,

FIG. 2 is a diagram showing the change in the thermodynamic state of exhaust gases, FIG. 3 in a graph showing the dependence of the pressure at the outlet of a compressor of a turbine as a function of the volume at the turbine inlet, FIG. 4 is a lateral cross-section of an internal combustion piston engine according to the invention, with a turbine mounted on a cylinder head, a dynamic discharge valve and an exhaust throttle valve, FIG. 5 is a plan view of the engine of FIG. 4, FIG. 6 is a plan view of an engine according to the invention, with a turbine mounted on the cylinder head and two exhaust valves mounted on the same side, FIG. 7 is a static control graph of the exhaust valves, FIG. 8 is a static control graph for the turbine exhaust and variable control valve for control of the dynamic discharge (full load), FIG. 9 is a static control graph for the turbine exhaust and variable control valve for the dynamic discharge valve (mean load)

Figure 1:
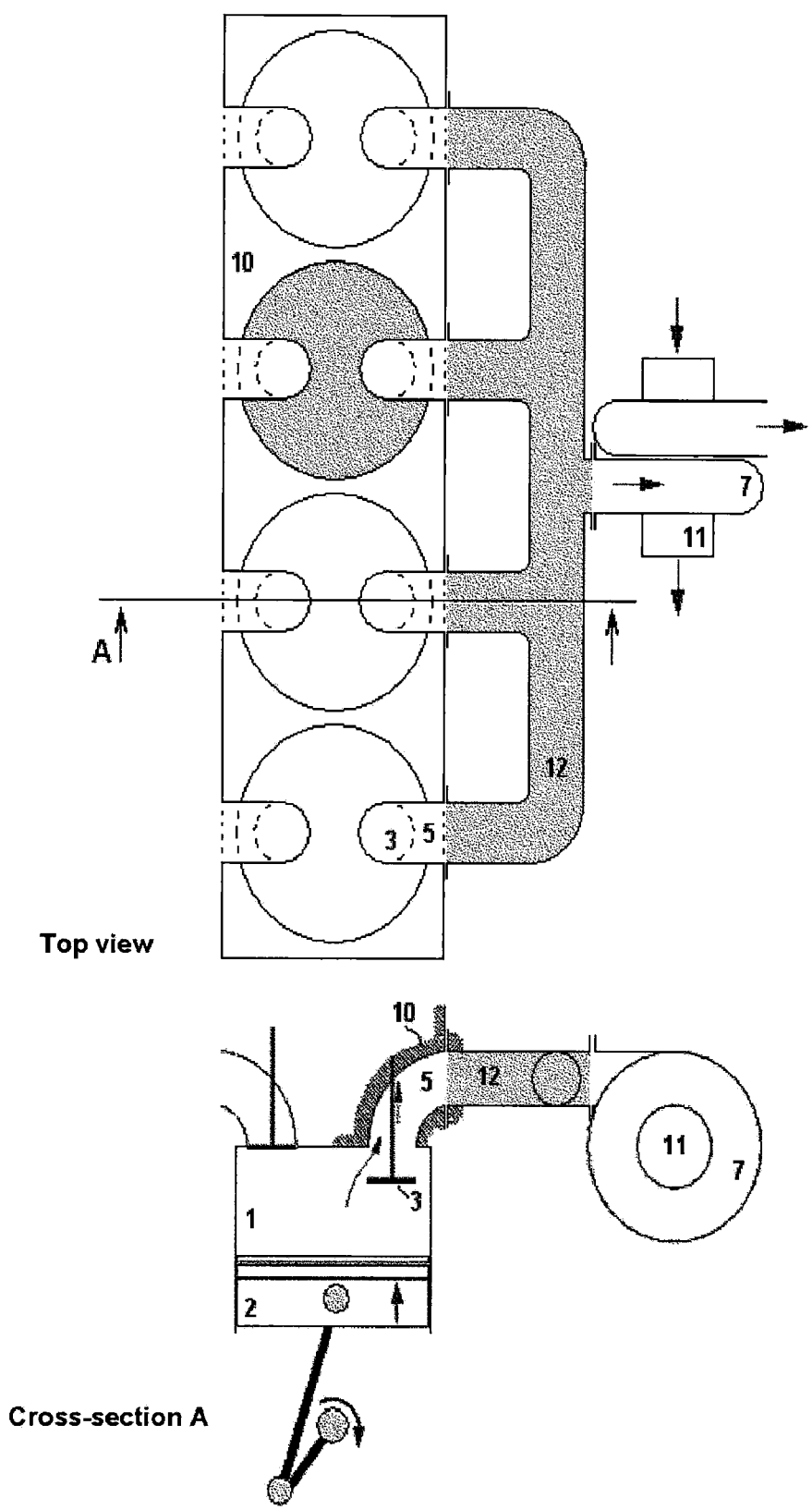
Figure 2:
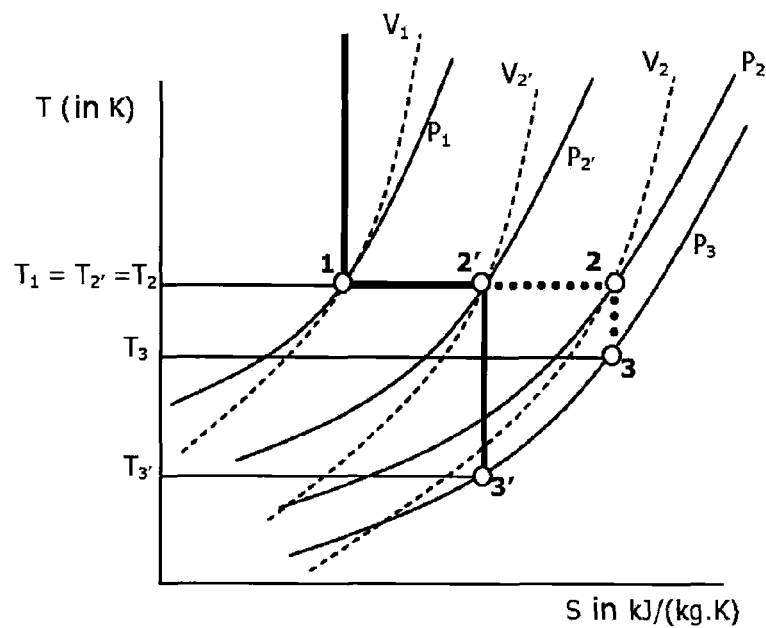
Figure 3:
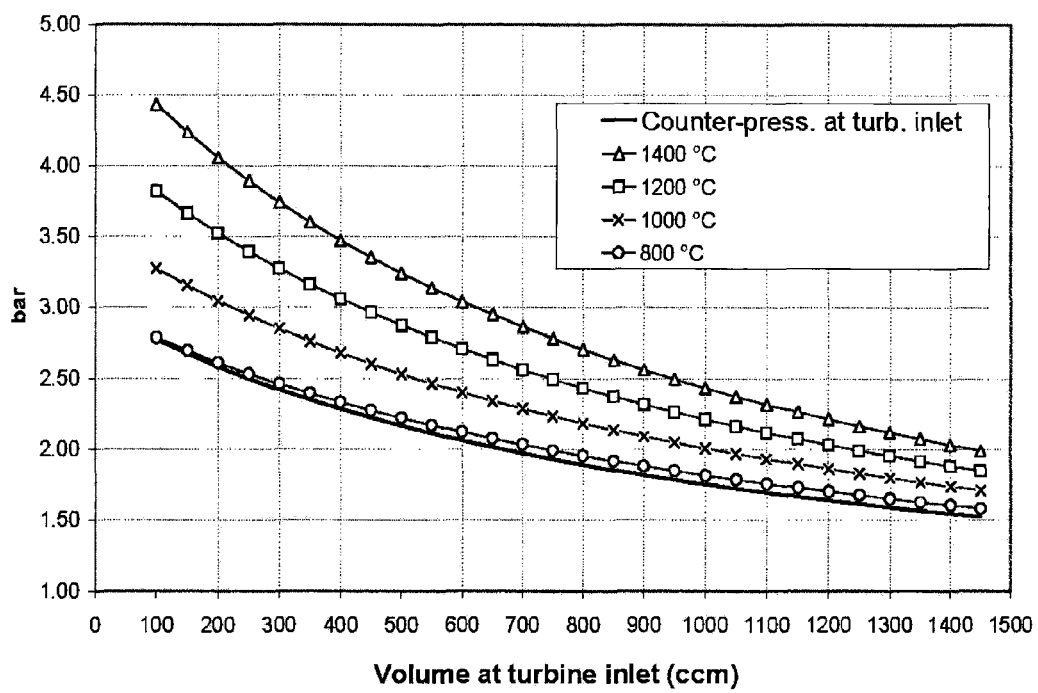
Figure 4:
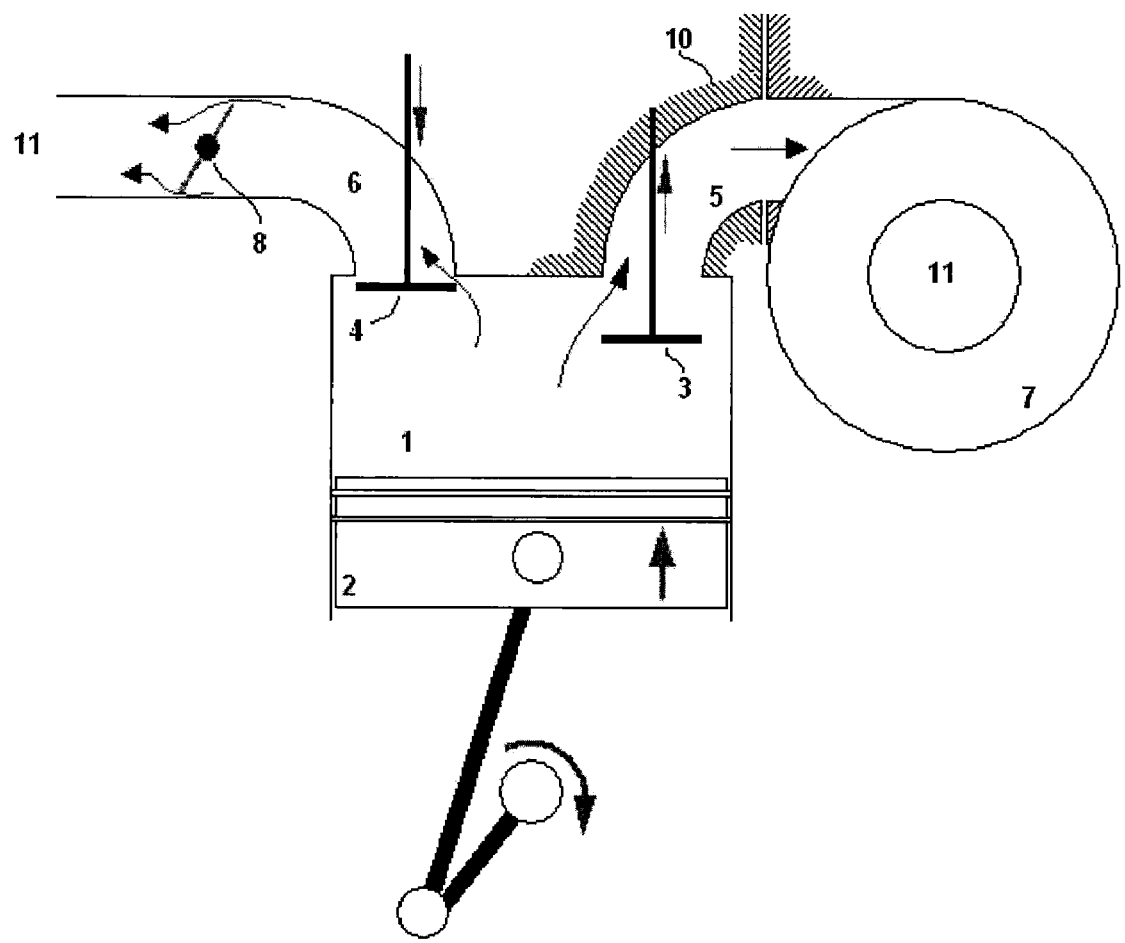
Figure 5:
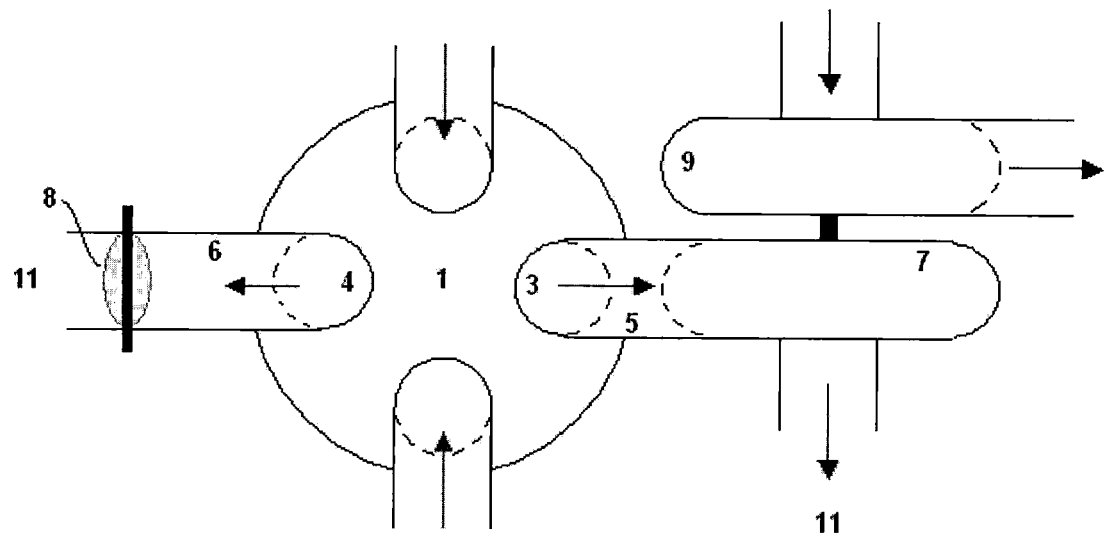
Figure 6:
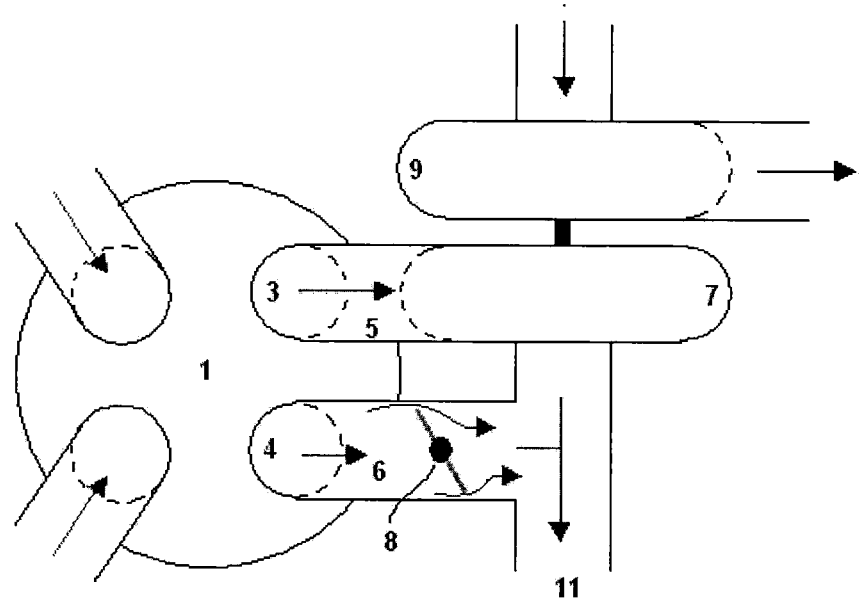

As shown in FIGS. 4 to 6, the internal combustion engine according to the invention includes a cylinder 1 in which a piston moves 2. On the cylinder head 10, downstream of an exhaust pipe 5, a turbine 7 connected to a compressor 9 is mounted, in association with an exhaust system 11. In addition, two exhaust valves are provided in this cylinder 1, one 3—the "turbine exhaust valve"—being capable of serving as a connection with the inlet of the turbine 7, and the other 4—the "dynamic exhaust valve"—being capable of serving as a connection with the exhaust system 11. In addition, the exhaust pipe 6 is equipped with a throttle valve 8 downstream of the dynamic exhaust valve 4. These two valves 3 and 4 can be mounted substantially diametrally opposite one another (FIG. 5) or, preferably, in the same cylindrical 180° portion, for example in the immediate vicinity of one another (FIG. 6).

The three modes of operation for adjusting the power of the turbo, which is the subject matter of this invention, will be described in greater detail below, in reference to the appended FIGS. 3 to 13:

Operation with STATIC control of the exhaust valves 3, 4 and WITH a throttle exhaust valve 8.

Figure 7:
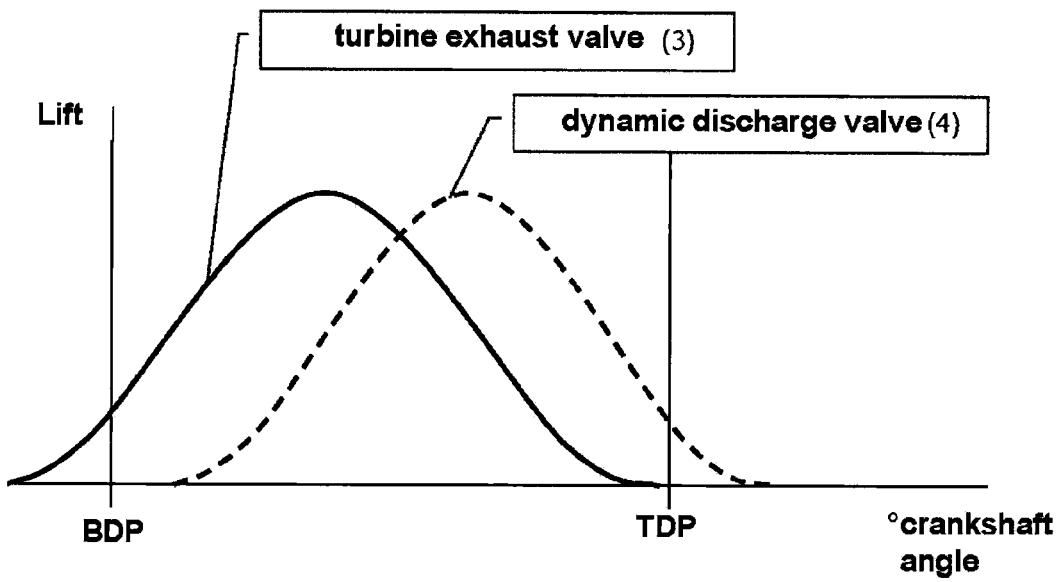

This embodiment, presented in FIGS. 4 and 7, shows that shortly before the piston 2 arrives from the internal combustion engine at its top dead point (TDP), the turbine exhaust valve 3 opens. The combustion gases, which are under residual pressure, then escape partially through said valve 3 and through the exhaust tube 5 provided in the cylinder head 10, toward the inlet of the turbine 7. The latter is mounted directly on this same cylinder head 10 and receives combustion gases only from a single cylinder 1.

In a subsequent position of the crankshaft, at approximately 30 to 60° (crankshaft angle), the dynamic discharge valve 4 opens while the turbine exhaust valve 3 remains open. From this time on, some of the combustion gases contained in the cylinder 1 will escape through said valve 4 and accumulate in the exhaust pipe 6 provided in the cylinder head, upstream of the throttle valve 8, itself provided in this pipe 6, as close as possible to the dynamic discharge valve 4. The amount of combustion cases escaping through the dynamic discharge valve 4 will be dependent on the opening of the throttle valve 8, which will be continuously mechanically or electronically controlled. At full load, this valve will be fully closed, and at minimal charge, it will be fully open.

The control of the exhaust valves 3 and 4 will be performed, as for a conventional exhaust valve, by means of a cam. The two valves will close when the piston 2 is close to its top dead point (TDP).

Operation with STATIC control of the turbine exhaust valve 3 and with CONTINUOUS VARIABLE control of the dynamic discharge valve 4, WITHOUT a throttle exhaust valve 8

Figure 8:
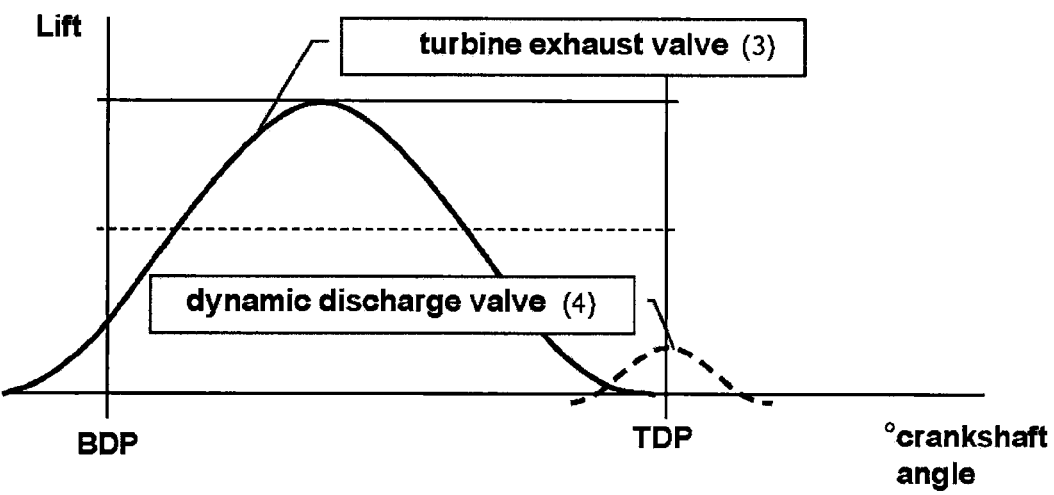
Figure 9:
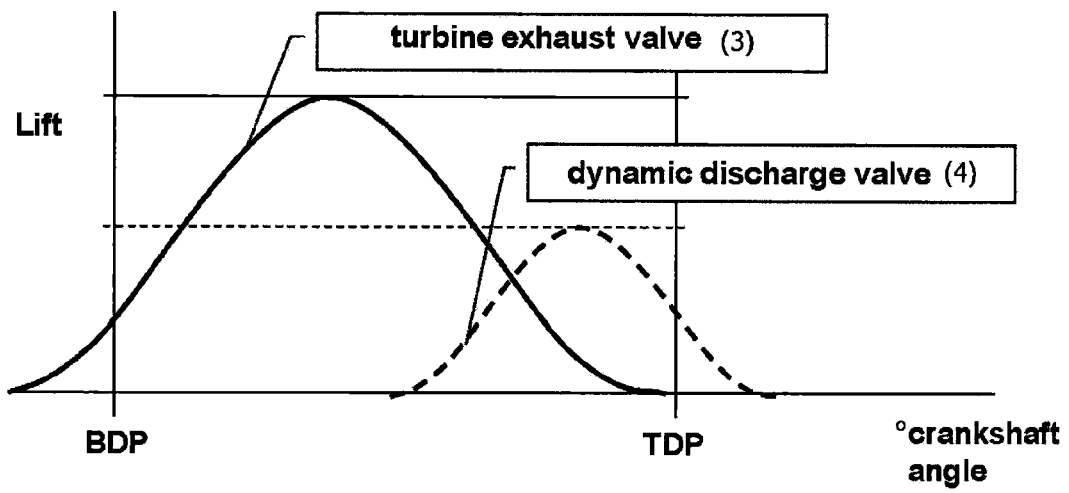
Figure 10:
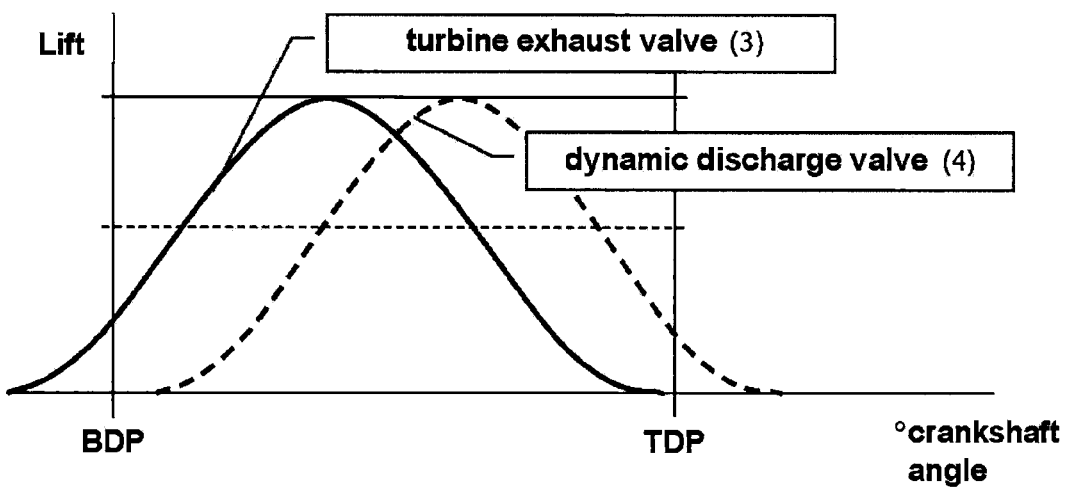
FIG. 10 is a static control graph for the turbine exhaust and variable control valve for the dynamic discharge valve (light load)

In this embodiment, shown in FIGS. 8 to 10, the turbine exhaust valve 3 is controlled in the same way as in the static valve control embodiment for the two exhaust valves 3 and 4, described above.

With regard to the dynamic discharge valve 4, it will be controlled variably and continuously, so that, at full load, this valve absolutely does not open, or opens only during the travel over several angle degrees of the crankshaft in the vicinity of the TDP of the piston 2 and with a very low maximum lift (see FIG. 8). As it becomes necessary to reduce the pressure of the turbine 7, the duration of opening of the dynamic discharge valve 4 will be prolonged while moving the opening point toward the TDP, keeping the closure time in the vicinity of the TDP of the piston 2 and simultaneously increasing the maximum lift (see FIGS. 9 and 10). It thus appears that the throttle valve 8 is no longer necessary and can be omitted.

Operation with STATIC control of the turbine exhaust valve 3 and with DISCONTINUOUS VARIABLE control of the dynamic discharge valve 4, WITH a throttle exhaust valve 8

In this embodiment, also shown in FIGS. 8 to 10, the turbine exhaust valve 3 is controlled in the same way as described in the paragraph above.

With regard to the dynamic discharge valve 4, it will be controlled variably and discontinuously, so that, at full load, this valve absolutely does not open, or opens only during the travel over several angle degrees of the crankshaft in the vicinity of the TDP of the piston 2 and with a very low maximum lift. As it becomes necessary to reduce the pressure of the turbine 7, a lift law will be selected with a prolonged duration of opening while moving the opening point toward the TDP, keeping the closure time in the vicinity of the TDP of the piston 2 and simultaneously increasing the maximum lift. The finer adjustment of the flow rate through the dynamic discharge valve 4 will be performed by means of the throttle valve 8.

Figure 11:
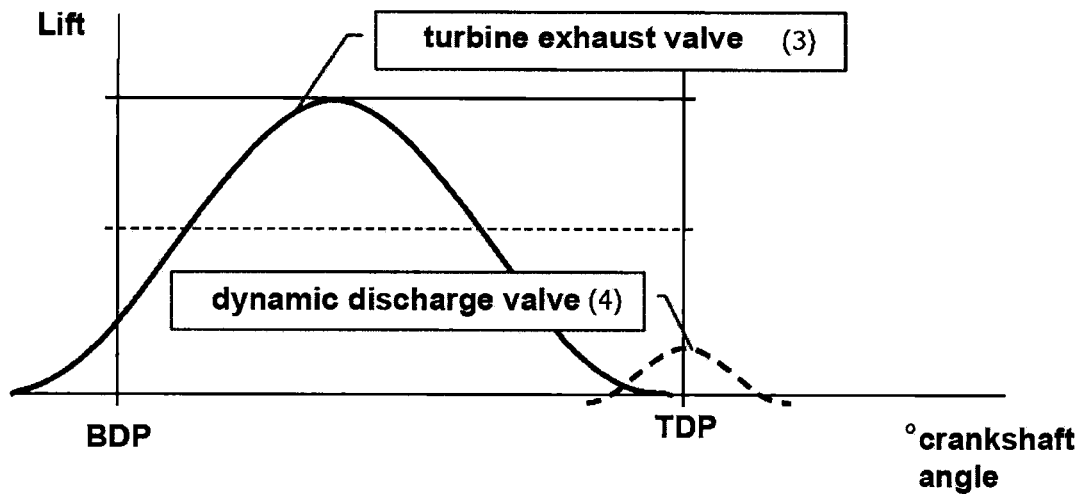
FIG. 11 is a variable control graph for the two exhaust valves (full load)
Figure 12:
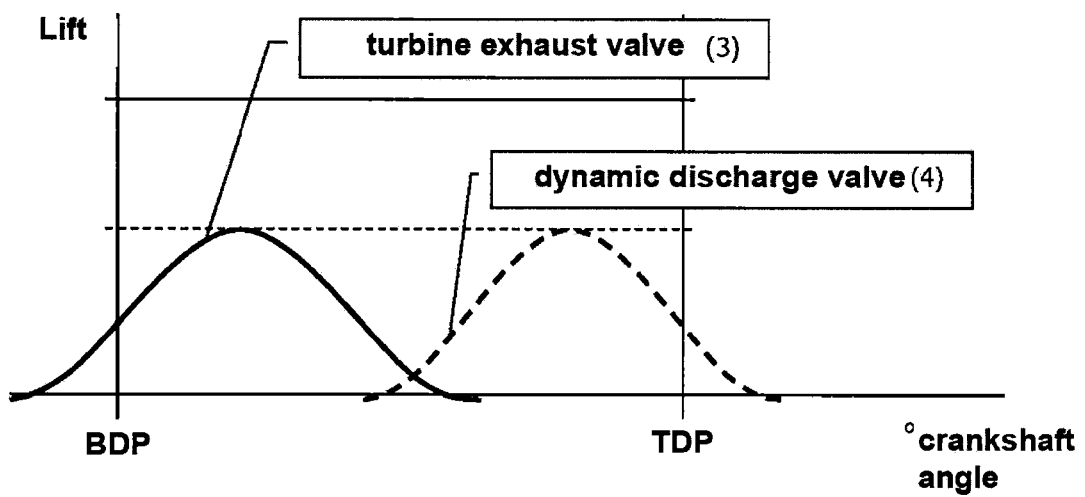
FIG. 12 is a variable control graph for the two exhaust valves (mean load)
Figure 13:
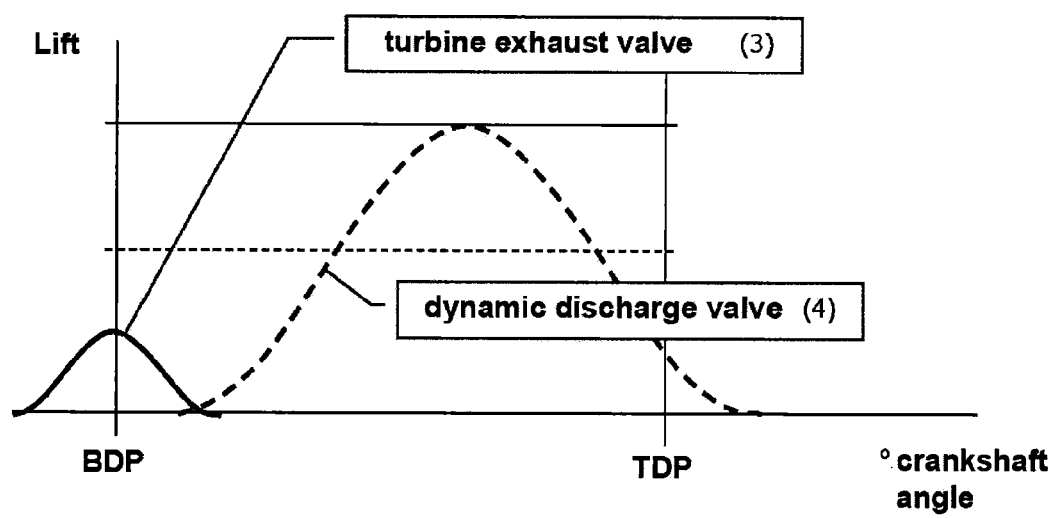
FIG. 13 is a variable control graph for the two exhaust valves (light load).

Each of the embodiments described above can be combined with a continuous or discontinuous VARIABLE control of the turbine exhaust valve 3 (see FIGS. 11 to 13). In this case, the turbine exhaust valve 3 will also be controlled variably, so that, at a light load, it absolutely does not open, or opens only during the travel over several angle degrees of the crankshaft in the vicinity of the TDP of the piston 2 and with a very low maximum lift. As it becomes necessary to reduce the pressure of the turbine 7, the duration of opening of the turbine exhaust valve 3 will be prolonged while moving the closure point back toward the TDP, keeping the opening time in the vicinity of the TDP of the piston 2 and simultaneously increasing the maximum lift. This can be performed either continuously or discontinuously.

The invention claimed is:

1. An internal combustion piston engine of the type comprising at least one cylinder equipped with an exhaust valve (3) associated with the turbine (7) of a turbocharger intended to recover some of the residual energy contained in the combustion gases, by means of an additional expansion thereof in said turbine of the turbocharger so as to drive the compressor of this same turbocharger and thus turbocharge said internal combustion engine, in which the turbine (7) of each cylinder (1) that releases said combustion gases is mounted directly on the cylinder head (10) downstream of the exhaust valve (3) and without the intermediary of a manifold (12) located between the cylinder head (10) and the inlet of this turbine (7), characterized in that at least one additional exhaust valve (4) or dynamic discharge valve is provided in the cylinder head (10) of the cylinder (1) and configured so that the gases that escape through this dynamic discharge valve are sent directly to an exhaust system (11) without first passing through the turbine (7) of said turbocharger and so that the opening of said dynamic discharge valve is controlled so as to open during each exhaust cycle performed in said cylinder at the earliest substantially after the exhaust valve (3) opens and so as to close at the latest when the piston (2) of said cylinder has just passed its top dead point after having completed its exhaust stroke.

2. The internal combustion engine according to claim 1, characterized in that a throttle valve (8) with variable closure and capable of being controlled, is provided in an exhaust pipe (6) supplied with the combustion gases passing through the dynamic discharge valve (4), which exhaust valve is configured so that the amount of combustion gases that escape from said exhaust pipe and that are no longer available for the turbine is directly proportional to the opening of this throttle valve, thus reducing the power of said turbine.

3. The internal combustion engine according to claim 1, characterized in that a control enables variable and continuous adjustment of the opening of the dynamic discharge valve (4) so that the duration and maximum lift of the opening of this dynamic discharge valve can be adjusted in order to cause a second determined portion of the combustion gases to escape so that the first portion of combustion gases, which is directed toward the turbine (7) through the turbine exhaust valve (3), is adapted to the power necessary for the turbine (7).

4. The internal combustion engine according to claim 1, characterized in that a control enables variable, continuous or even discontinuous adjustment of the turbine exhaust valve (3), so as to minimize the overlapping of the opening of this turbine exhaust valve with the opening of the dynamic discharge valve (4).

5. The internal combustion engine according to claim 2, characterized in that a control enables variable, continuous or even discontinuous adjustment of the turbine exhaust valve (3), so as to minimize the overlapping of the opening of this turbine exhaust valve with the opening of the dynamic discharge valve (4).

6. The internal combustion engine according to claim 3, characterized in that a control enables variable, continuous or even discontinuous adjustment of the turbine exhaust valve (3), so as to minimize the overlapping of the opening of this turbine exhaust valve with the opening of the dynamic discharge valve (4).

* * * * *